United States Patent [19]

Cooper et al.

[11] Patent Number: 4,667,229
[45] Date of Patent: May 19, 1987

[54] COLOR VIDEO ENDOSCOPE SYSTEM

[75] Inventors: David H. Cooper, Saratoga, Calif.; Makoto Toyota, Omiya, Japan; Janos L. Hunyady, San Jose, Calif.

[73] Assignee: Fuji Photo Optical Company, Ltd., Omiya, Japan

[21] Appl. No.: 611,864

[22] Filed: May 18, 1984

[51] Int. Cl.$^4$ .............................................. H04N 7/18
[52] U.S. Cl. .......................................... 358/98; 128/6
[58] Field of Search ...................... 358/98, 1, 901, 209; 128/4–11

[56] References Cited

U.S. PATENT DOCUMENTS

| | | | |
|---|---|---|---|
| 3,375,388 | 3/1968 | Sheldon | 358/98 X |
| 4,074,306 | 2/1978 | Kakinuma et al. | 128/6 X |
| 4,253,447 | 3/1981 | Moore et al. | 358/98 X |
| 4,475,539 | 10/1984 | Konomura | 358/98 X |
| 4,532,918 | 8/1985 | Wheeler | 358/98 X |

OTHER PUBLICATIONS

"Handy Endoscopic Color TV System Using New Chalicon Pickup Tube"; Fukui et al, Toshiba Review, No. 97, pp. 24–29 5/6–75.

Primary Examiner—Howard W. Britton
Assistant Examiner—Victor R. Kostak
Attorney, Agent, or Firm—Michael L. Harrison

[57] ABSTRACT

A color video endoscope system having a control unit compatible with various endoscopes. Each endoscope generates unique signals to the control unit to optimize the clocking out of data from the solid state image sensor, to optimize the processing of data received from the image sensor, and to identify the size and location of the image formed on the image sensor so as to control the image formed on the monitor. The control unit generates alternating fields of red, green and blue light through the endoscope light guide with blank fields between the color fields, during which time data is clocked out of the image sensor, thereby preventing image "smear" caused by immediately successive color fields.

13 Claims, 7 Drawing Figures

COLOR VIDEO ENDOSCOPE SYSTEM

BACKGROUND OF THE INVENTION

This invention relates to a color video endoscope system, and in particular to an endoscope system in which the control unit is capable of operation with different image sensors and various types of endoscopes.

Various color video endoscope systems are described in U.S. Pat. No. 4,253,447 to Moore and U.S. Pat. No. 4,074,306 to Kakinuma. Such systems include a control unit which generates alternating fields of red, green, and blue light. The light is directed through a fiber optic light guide within a separate endoscope section which plugs into the control unit and which has a viewing head for insertion into the cavity to be viewed. The light reflected from the cavity into which the viewing head is inserted is received by a solid state image sensor in the viewing head. The image sensor transmits an electrical signal back to the control unit. The signal is divided into its separate red, green, and blue (RGB) components by the control unit and then later merged into a composite video signal compatible with a monitor or standard television receiver. In general, such conventional color video endoscope systems are integral units in that specific circuitry in the control unit for triggering the image sensor and for optimizing the output signal from the image sensor is matched with the specific characteristics of the image sensor and type of endoscope.

Such systems have inherent disadvantages, the primary one being that if a different type of endoscope is used or if the image sensor is replaced, the circuitry in the control unit must be readjusted to optimize performance. In addition, because such color video endoscope systems generate color fields which immediately follow one another, an image of one color incident on the image sensor is immediately followed by an image of another color. Complex circuitry is required in the control unit to modify the output signal from the image sensor in order to match the levels of the successive color fields, and to obtain the necessary "grey-scale" balance.

SUMMARY OF THE INVENTION

The invention is a color video endoscope system for use in displaying an image from inside a cavity onto a monitor, and includes an endoscope having means for identifying certain endoscope-specific characteristics, and a control unit having means for optimizing input and output signals to and from the image sensor in response to the identifying characteristics of the endoscope.

The endoscope includes a fiber optic light guide for delivering light into the cavity, air and water supply channels, a biopsy channel, a solid state image sensor, an optical focusing assembly for directing the reflected light to the image sensor, and electrical circuitry for buffering and driving signals between the image sensor and the control unit.

The control unit includes a light source, air and water supply channels for washing off and drying the viewing head of the endoscope, and insufflating the patient, means for generating color fields of light sequentially, clock circuitry for triggering and clocking out the signal from the image sensor, and circuitry for modifying the signal received from the image sensor, storing the signal according to corresponding color fields, and for combining the signals into a composite video signal compatible with a monitor.

The present invention includes means in the endoscope to identify one or more specific parameters which are unique to that endoscope. The endoscope generates signals, preferably voltage levels, which identify each of these parameters and which are used by the control unit to optimize the various control voltages and pulses to the image sensor and to clock data out of the image sensor, and to optimize The processing of the data output from the image sensor. Thus, with the present invention the control unit can operate with various types of endoscopes and with different image sensors. For example, each image sensor produces unique voltage level outputs in response to direct, unreflected light. Information relating to these voltage levels is required to preset the amount of gain through an amplifier in the control unit when the output from the image sensor for particular color fields is received. Similarly, there are various types of endoscopes, such as a colonoscope, gastroscope, and duodenoscope, each of which, because of different overall size limitations, creates a circular pattern of a specific size on the image sensor. In addition, some endoscopes, such as a duodenoscope, may create an image on the image sensor which is offset from center. Thus, information about the particular type of endoscope in use is also provided by the endoscope in the form of signals which are utilized by the control unit to alter the size and location of the image on the monitor.

The present invention also utilizes a frame-transfer image sensor having two registers, such as a frame-transfer charge coupled device (CCD), and a color wheel having three color filter sections with opaque or blanked sections between the color sections. Because there is a blanking interval between color fields and because the CCD contains two registers, the charges in the light-receiving register can be loaded into the storage register during the blanking interval, thereby preventing image "smear" caused by successive color fields.

For a fuller understanding of the nature and advantages of the invention, reference should be made to the ensuing detailed description taken in conjunction with the accompanying drawings.

DESCRIPTION OF THE PREFERRED EMBODIMENTS

Figure 1:
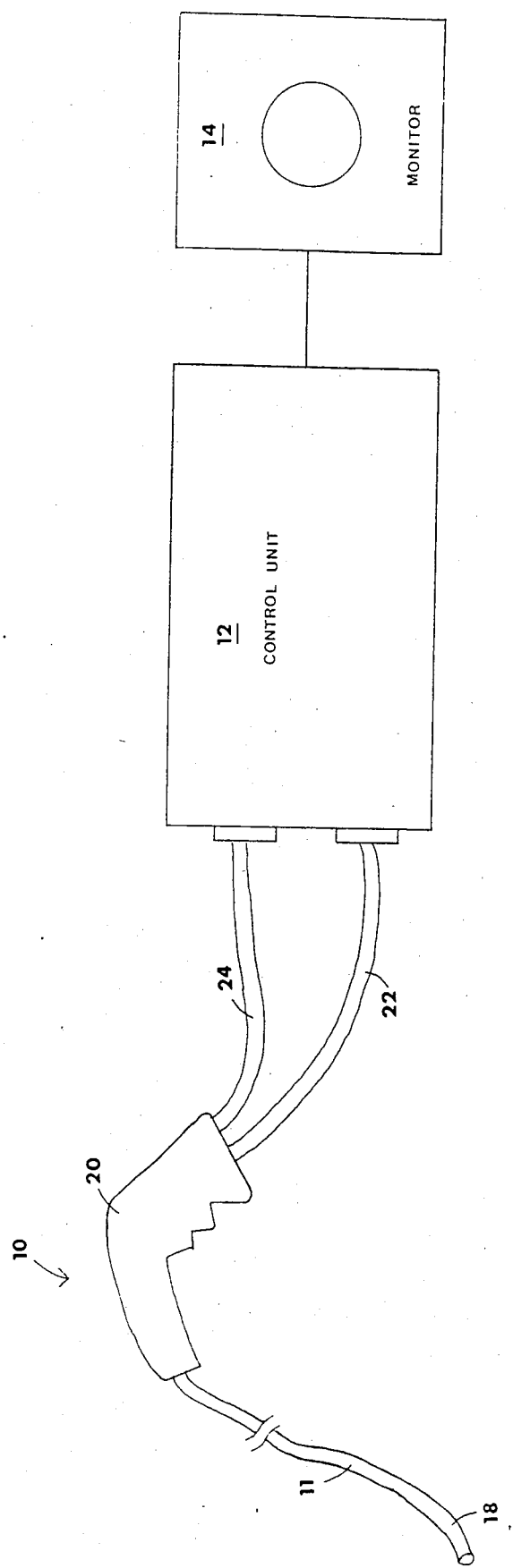
FIG. 1 is a simplified diagram illustrating the control unit, endoscope, and monitor.

Referring first to the simplified diagram of FIG. 1, the color video endoscope system includes generally an endoscope section 10 and a control unit 12. The control unit 12 provides a video output signal to a monitor 14 for display of the image. The endoscope section 10 includes an insertion tube 16 having a viewing head 18 at its distal end, an operating section 20 for control of the endoscope by the user, an electrical connector 22 between the operating section 20 and the control unit 12, and an electrical/mechanical connector 24 between the operating section 20 and control unit 12. Light is supplied from a light source in the control unit 12 and passes through a fiber optic light guide through connector 24, operating section 20, insertion tube 16 and viewing head 18. A water supply (not shown) for washing off the viewing head 18 and an air supply (not shown) to dry the view lens, or insufflate the patient, is also provided from control unit 12 through a conduit in connector 24, operating section 20 and insertion tube 16. Electrical connections are also provided to enable the activation of a suction valve (not shown) and air pump (not shown) located in the control unit 12, by switches at the operating section 20. Typically, the insertion tube 16 includes, in addition to the fiber optic light guide and air/water conduit, a biopsy channel which is accessed from operating section 20 to permit the user to take tissue samples through the distal end of insertion tube 16, and various electrical conductors to provide power and air pump and suction valve control. Included in the viewing head 18 of the endoscope 10 is the image sensor and the lens assembly for directing and focusing the reflected light from the cavity back to the image sensor. An electrical connection is made between the image sensor and the control unit 12 through an electrical connector in insertion tube 16 between viewing head 18 and operating section 20 and through electrical connector 22. The viewing head 18 also includes circuitry to buffer the electrical pulses from the control unit 12 which trigger the image sensor to transfer its output data and to amplify the output signal from the image sensor back to the control unit 12.

Figure 2:
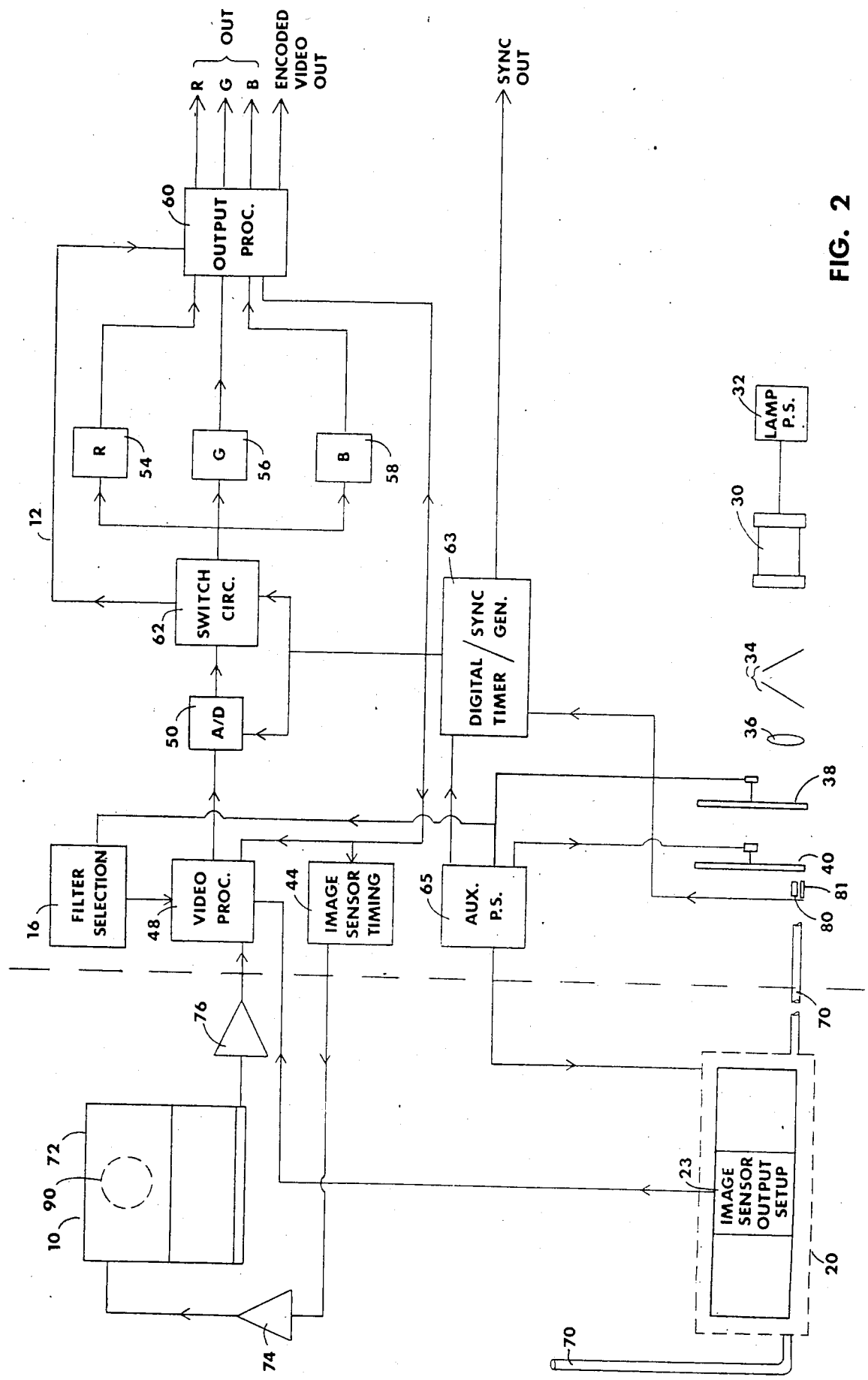
FIG. 2 is a block diagram of the control unit, the endoscope and their interconnections.

The above explanation of the color video endoscope system can be further understood by reference to the block diagram in FIG. 2, wherein the primary components of control unit 12 and endoscope 10 are illustrated. Control unit 12 comprises a light source 30, a color wheel 40, a digital timer/sync generator 63, an auxiliary power supply 65, image sensor timing circuitry 44, video processor 48 which receives the output signal from the image sensor, analog/digital (A/D) converter 50, memory storage units 54, 56, 58 for receiving and temporarily storing data corresponding to image sensor output for the respective color fields of light, an output processor 60 for generating RGB and encoded video signals in which data corresponding to the color fields appears simultaneously, and switching circuitry 62 for controlling the data corresponding to the color fields to the output processor 60.

The endoscope 10 includes a fiber optic light guide 70 for directing light into the cavity, an operating section 20, an optical focusing assembly (not shown) in the viewing head 18 (FIG. 1) for focusing the reflected light, an image sensor 72, buffer circuitry 74 between the image sensor timing circuitry 44 and the image sensor 72, and output signal driving circuitry 76 between image sensor 72 and video processor 48 of the control unit 12. The dotted lines in FIG. 2 illustrate the separation of endoscope 10 and control unit 12. Electrical connection is made between the operating section 20 of endoscope 10 and control unit 12 through electrical connector 22 and includes specifically the connections between image sensor controlpulse circuitry 21 and image sensor timing circuitry 44, image sensor output setup circuitry 23 and video processor 48, endoscope identification circuitry 25 and sync generator 63, image sensor 72 and video processor 48, and operating section 20 and power supply 65. Mechanical connection is made between the distal end of insertion tube 16 and control unit 12 by light guide 70 and a water conduit (not shown), both of which pass through insertion tube 16, operating section 20 and connector 24.

Figure 3:
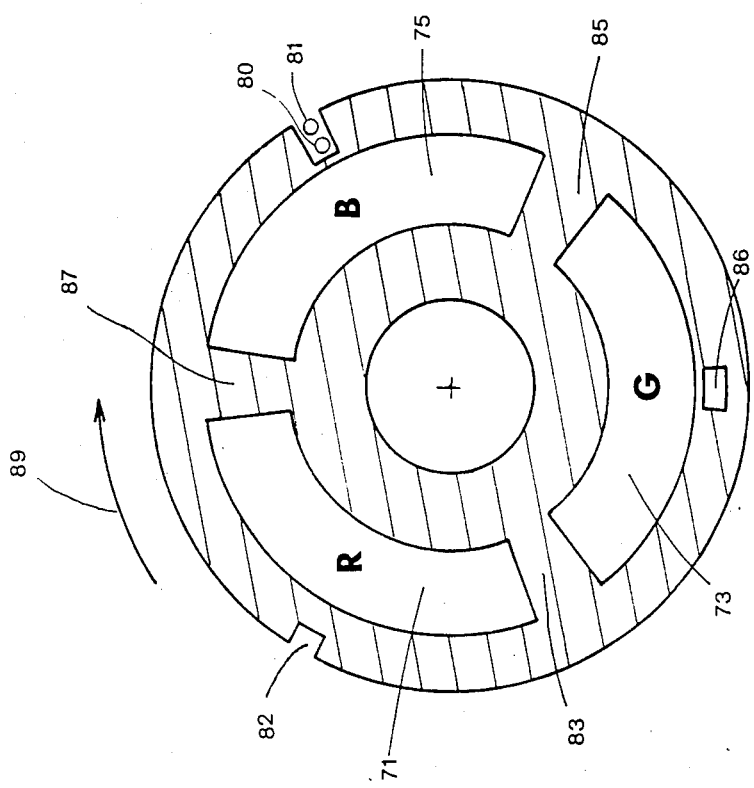
FIG. 3 is a plan view illustrating the color filter and blanking sections of the color wheel.

The general operation of the endoscope system can be better understood by explaining the specific function of the above-described components during operation. The light source 30, which is typically a xenon short-arc lamp, receives power from a lamp power supply 32 and transmits light through a pair of infrared filters 34, a lens 36, a neutral-density wheel 38, and color wheel 40 into the input end of the fiber optic light guide 70. The neutral density wheel 38 is a rotatable filter which may be rotated to different positions to adjust the total light received by the light guide 70. The color wheel 40, as illustrated in FIG. 3, contains alternating color filter sections or segments of red 71, green 73 and blue 75, and opaque circular segments 83, 85, 87 located between the color filter segments. The color wheel 40 is rotated at a constant speed controlled by sync generator 63 so that each filter segment completely traverses the light path within approximately 1/60th of a second. As illustrated in FIG. 2, a pair of light sensitive devices, such as photodiodes 80, 81, are aligned in the light path and oriented at the perimeter of color wheel 40. Located around the perimeter of color wheel 40 is a pattern of opaque and transparent sections 82, 84, 86 (FIG. 3), which rotate through the light path in which the photodiodes 80, 81 are aligned. The photodiodes 80, 81 will produce output or no output, depending upon which color field is in proximity to them. For example, when the transparent pattern 84, corresponding to blue segment 75, is aligned between the light path and the photodiodes as shown in FIG. 3, both photodiodes will produce an output. With this arrangement, it is possible to provide a signal to the digital timer 63 to synchronize the rotation of color wheel 40 with the operation of video processor 48, which is receiving signals from image sensor 72 corresponding to the respective color fields, to identify which color field is active at any time.

As the color wheel 40 rotates, in the direction of arrow 89, light of various colors are sequentially passed into light guide 70 and thus into the cavity where the viewing head 18 of the endoscope insertion tube 16 is located. This colored light is then reflected and focused by the lens assembly (not shown) in the viewing head onto image sensor 72. As shown in FIG. 2, the output of the lens assembly focuses a pattern designated by circular line 90 onto image sensor 72, whose detailed operation will be described below. Thus, for approximately 1/60th of a second the image sensor 72 has received red light and generated electrical charges in its various cells corresponding to the amount of red light energy received by each cell. As the color wheel 40 continues to rotate in the direction of arrow 90, a blank section 83 passes in front of light source 30 and no light enters the light guide 70 or the cavity. During this blanking interval, the data stored in the "A" portion of the image sensor 72 is shifted to the "B" portion, and the data stored in the "B" portion is shifted out serially through driver circuitry 76 and ultimately to the video processor 48. The image sensor timing circuitry 44, which is controlled by the master timer 63, pulses the image sensor 72 during this blanking interval, thereby clocking the data out of the image sensor 72. Simultaneously, the video processor 48 receives a signal from the master timer 63 to transfer data corresponding to one color field out to the A/D converter 50 and ultimately to one of the memory storage devices 54, 56, 58, so that the video processor 48 may receive data from the image sensor 72 corresponding to the next color field. As shown in FIG. 2, there are three memory storage devices, each of which is preferably a dynamic random access memory (DRAM), for storing digital data corresponding to the output signal for one particular color field from image sensor 72. The switching circuitry 62, which is similarly controlled by digital timer 63, alternately triggers data to be transferred from A/D converter 50 into the respective DRAMs. The switching circuitry 62 also includes means for simultaneously transferring data corresponding to one color field from A/D converter 50 both to its respective DRAM and directly to output processor 60. Thus the output processor 60 generates a composite video signal by taking data from two color fields prior in time out of their DRAMs and combining this data with the data from one color field which has been transferred directly from the switching circuitry 62. The output processor 60 provides both an RGB output which is fully compatible with a color monitor and an encoded video output through (FIG. 2).

Figure 4:
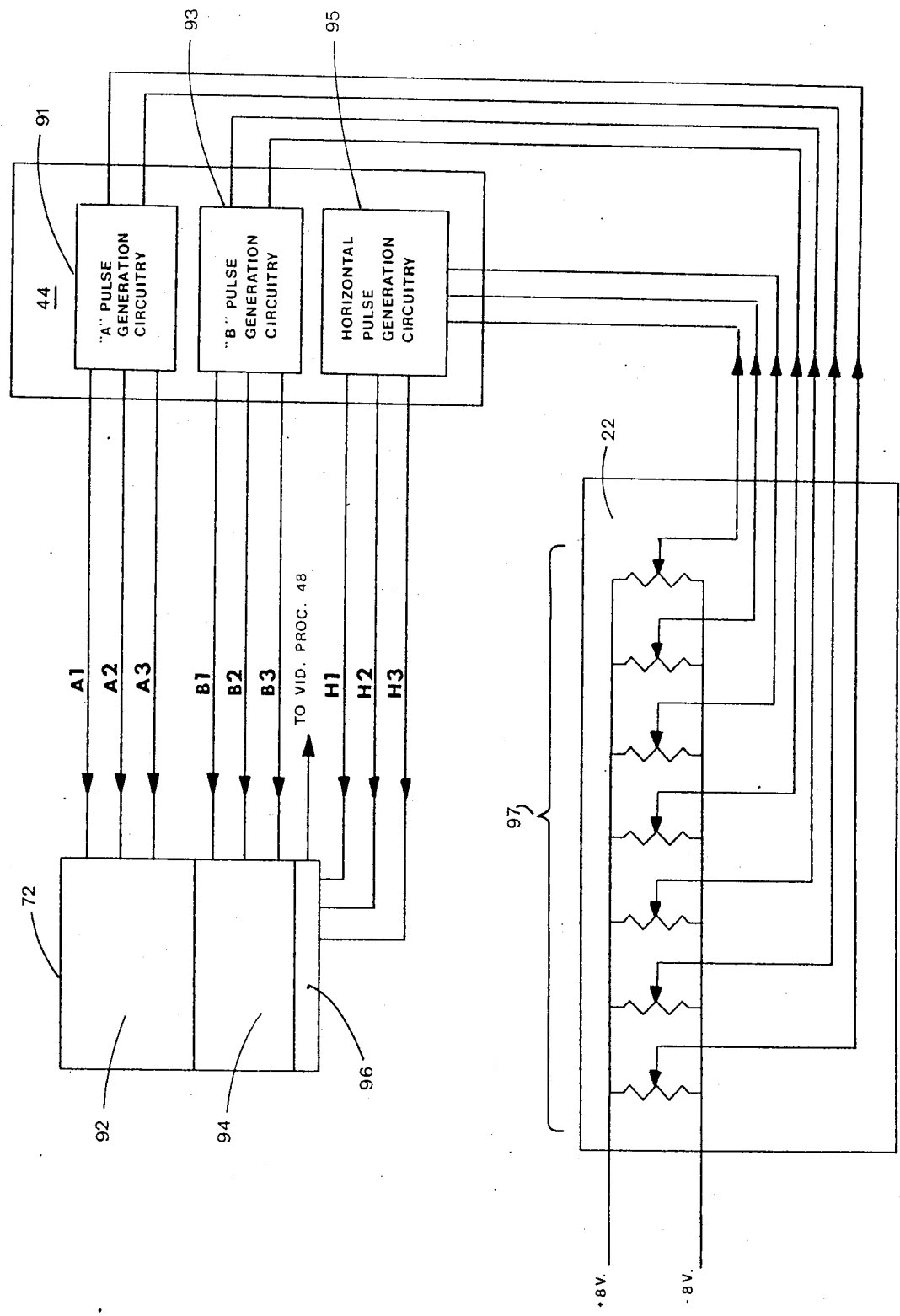
FIG. 4 is a block diagram of the control unit video processor illustrating input connections of various endoscope dependent signals to optimize the triggering of the output signal from the image sensor.

The image sensor controlpulse circuitry 21 in the operating section 20 of the endoscope 10, which provides reference signals unique to that particular endoscope to the image sensor timing circuitry 44 in the control unit 12, will now be explained by reference to FIG. 4, where image sensor 72 is shown with its various input and output lines.

The image sensor 72 utilized in the present invention is a frame-transfer charge coupled device (CCD), in particular RCA model SID 504. The CCD has three registers, an A register 92 for receipt of the image from the lens assembly of the viewing head, a B register 94, and a horizontal shift register 96. Each register is made up of a matrix of cells or pixels, each of which develops a particular voltage level in response to light energy. In the A register 94 of the CCD 72 there are 244 vertical columns and 403 horizontal rows of pixels. The voltage level in each of the pixels constitutes data corresponding to the light intensity striking that pixel, and that voltage level can be transferred to a pixel in the row directly beneath it by means of a series of pulses which cause the charge to ripple from one pixel to the pixel in the row directly beneath it. This characteristic of the CCD permits the charges stored in the A register to be shifted into the B register one row at a time, the charges in the B register to be shifted into the horizontal register one row at a time, and the charges in the horizontal register to be shifted out one charge at a time serially to the video processor 48 of the control unit 12.

By reference to FIG. 4, the manner in which the image sensor timing circuitry 44 clocks out the data from the image sensor 72 will be explained. The image sensor timing circuitry 44 is connected to the image sensor 72, in this case the frame-transfer CCD, by means of three input lines designated A-1, A-2, A-3, three input lines designated B-1, B-2, B-3, and three input lines designated H-1, H-2, H-3. There are other interconnection lines providing additional control signals to the CCD 72 which are not necessary to a basic understanding of the manner in which the image sensor timing circuitry clocks out data from the CCD 72. Just at the end of one color field, for example just at the point where the end of the red filter segment 71 of color wheel 40 passes through the light path, the pixels in the A register are charged to specific voltage levels corresponding to the reflected red light incident on each pixel. At the next instant, namely the beginning of the blanking interval caused by opaque segment 83 passing through the light path, all the charges stored in the A register 92 are to be clocked and shifted into the B register 94, which, as explained below, will be empty at that time. When the blanking interval is completed, the image pixels will all be emptied their charge data image transferred to the B register. When the green color field commences, the A register will be exposed to the reflected green light from the new field and a new charge image will appear. This field is a little less than 1/60th of a second, during which time the charges in the B register 94, which are charges corresponding to the preceding red field, are shifted one pixel row at a time into in the horizontal register 96. Simultaneously, the charges in the row of pixel elements constituting horizontal register 96 are clocked out serially through driver circuitry 76 to video processor 48. All of this is accomplished by sending in phases three pulses to the registers of CCD 72. The pulses along lines A-1, A-2, and A-3 move the charge from the horizontal rows in the A register 92 into the horizontal rows in the B register 94. The pulses along lines B-1, B-2, B-3 move the charge from the horizontal rows in the B register one row at a time into the horizontal register 96, and the pulses along lines H-1, H-2, and H-3 clock the charges out of the horizontal register 96 and out to video processor 48. Thus, at the end of the blanking interval immediately following the red field, all of the data stored in the B register 94, which is data from the immediately preceding blue field, has been shifted out one row at a time to the video processor 48 for storage in DRAM 58 which is the blue field memory. At the same time all of the data in the A register 92 has been shifted and now resides in the B register 94, which now contains data from the immediately preceding red field. The A register 92 is now completely reset and ready for receiving the reflected light from the next field, which will be the green field created by filter segment 73 (FIG. 3).

Each image sensor, in this case CCD 72, has unique characteristics in that pulses of a specific peak-to-peak amplitude and level are required to properly shift or ripple the charges from one row of pixels to the row of pixels immediately below. Each CCD must be calibrated in order to determine the optimum characteristics of the pulses which provide the best performance of data transfer out of the CCD. In conventional color video endoscopes which utilize solid state image sensors, the characteristics of these pulses are preset in the control unit. Accordingly, a control unit will function properly only with one specific image sensor. In the event a different image sensor is used, such as a replacement for a defective one, or if a different type of endoscope is used, such as a colonoscope, the control unit must be reset or recalibrated. In the present invention, as illustrated in FIG. 4, the operating section 20 of the endoscope includes an image sensor control pulse circuitry 22 which, when the endoscope 10 is electrically connected to the control unit 12, provides the necessary values of referenced pulse levels and peak-to-peak amplitudes to the image sensor timing circuitry 44. As illustrated in FIG. 4, there are two reference voltage levels supplied to the A pulse generation circuit 91, two reference voltage levels supplied to the B pulse generation circuit 93, and three reference voltage levels supplied to the horizontal pulse generation circuit 95. These voltage levels are set within the image sensor control pulse circuitry 22 of the operating section 20 by means of potentiometers 97 in order to optimize the required clock pulses from the image sensor timing circuitry 44 for the particular image sensor contained within the endoscope 10. For example, in the event a colonoscope is used with the control unit 12 of the present invention, it may be plugged directly into the control unit 12 and the referenced levels provided in its image sensor control pulse will automatically provide the proper pulse levels and peak-to-peak amplitudes to the timing circuitry 44 to properly clock out the data from the colonoscope image sensor.

In addition to the pulse voltage levels to optimize the clocking out of data from the image sensor, other parameters which are unique to the particular image sensor are the characteristics of red, green, and blue "gain", "flare", and "black level". The "gain" characteristic of an image sensor is a function of the distal end of the endoscope. A particular distal end assembly consisting of a lens assembly and image sensor, has a unique sensitivity and spectral response characteristic. This means that each assembly will produce a unique set of red, green and blue signal levels. In a conventional color television system, these signals must be processed and amplified to equal levels, therefore, the processor gain must change for each color field, and for each endoscope employed. The parameter "flare" is a characteristic of an image sensor which is a function of the scattered light in the optical system. Flare is also referred to as "veiling glare". It is a characteristic which reduces contrast, the primary contributor being that the CCD reflects light back into the optical system. The flare characteristic varies with each particular CCD and with each color field. The parameter "black level" is the signal level obtained when no light is entering the optical system, and will depend principally on the image sensor dark current and leakage current. As the gain corresponding to each color field will be different, the black levels will be differently amplified during each field, and must be clamped to the same levels in the video processor 48.

In conventional color video endoscope systems, these three parameters unique to the particular CCD, namely gain, flare, and black level for each of the three colors, is preset within the video processor. In the event a different endoscope is used with the control unit, these parameters must be reset within the video processor in order to provide optimum performance. In the present invention, however, as illustrated in FIG. 5, the image sensor output setup circuitry 23 forming part of the operating section 10 of the endoscope is electrically connected to the video processor 48 of the control unit 12, and generates signals identifying the gain, flare and black level characteristics of image sensor 72.

Figure 5:
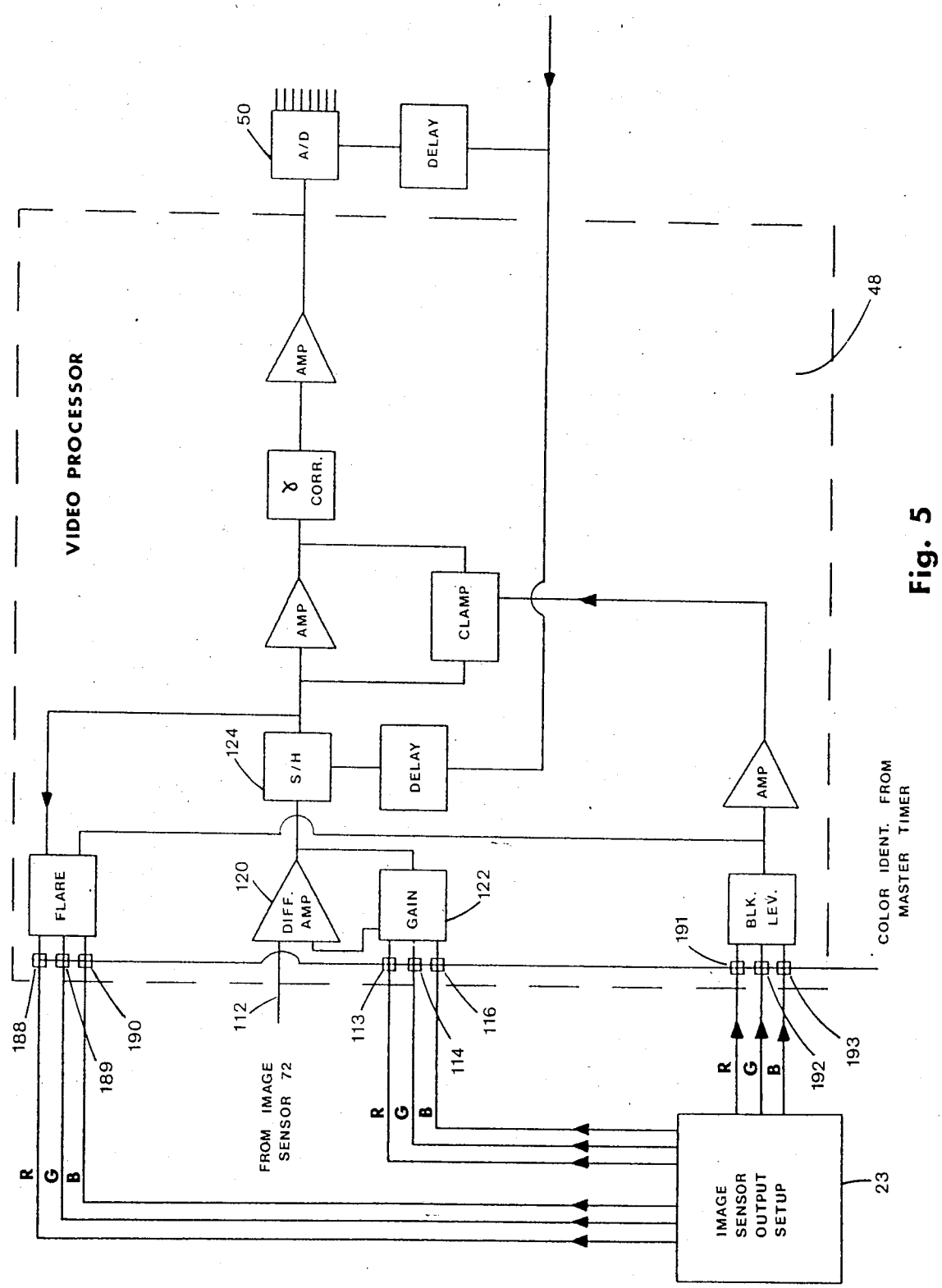
FIG. 5 is a block diagram of the image sensor timing circuitry in the control unit and the input connections of reference signals from the endoscope to optimize the output signals from the image sensor.

As shown in FIG. 5, the image sensor output signal on line 112 is directed to a differential amplifier 120 where a particular gain is applied to it before it is transferred to sample and hold circuit 124. In the present invention, the gain applied to the differential amplifier 120 is dependent upon whether data from a red, green, or blue color field is being transferred to the differential amplifier 120. The amount of gain necessary to optimize the red, green and blue characteristics of the particular CCD is different for each color field. Particular reference voltage levels are applied to the gain control circuitry 122 from the image sensor output setup circuitry 23 through gates 113, 114, 116, located between the circuitry 23 and the gain control circuitry 122. As red, green, or blue color field data is transferred to amplifier 120 along line 112, a signal from the color identification circuitry in the sync generator 63 (FIG. 1) turns on the appropriate gate 113, 114 or 116, thereby setting the gain control circuitry 122 to the proper preset level according to the correct color field.

Flare correction is necessary to compensate for the effect of scattered light in the optical system, which tends to raise the black level and reduce contrast. Since flare is approximately proportional to the total illumination entering the optical system, the correction signal is derived by integrating the video signal prior to gamma correction. The percentage of the integrated video signal, which is applied to correct the black level is determined by a control voltage from the image sensor output setup circuitry 23 and the color field gates 188, 189, 190. Similarly, the unique black level correction required during each color field is derived from the control voltages provided by image sensor output setup circuitry 23, via the color field gates 191, 192, 193.

Thus, as illustrated in FIG. 5, the video processor 48 can function with different versions of endoscopes in that each endoscope provides a unique set of setup signals from its operating section 20 for the gain, flare, and black level controls to optimize the performance of the video processor 48 in processing the signal received from the image sensor.

Figure 7:
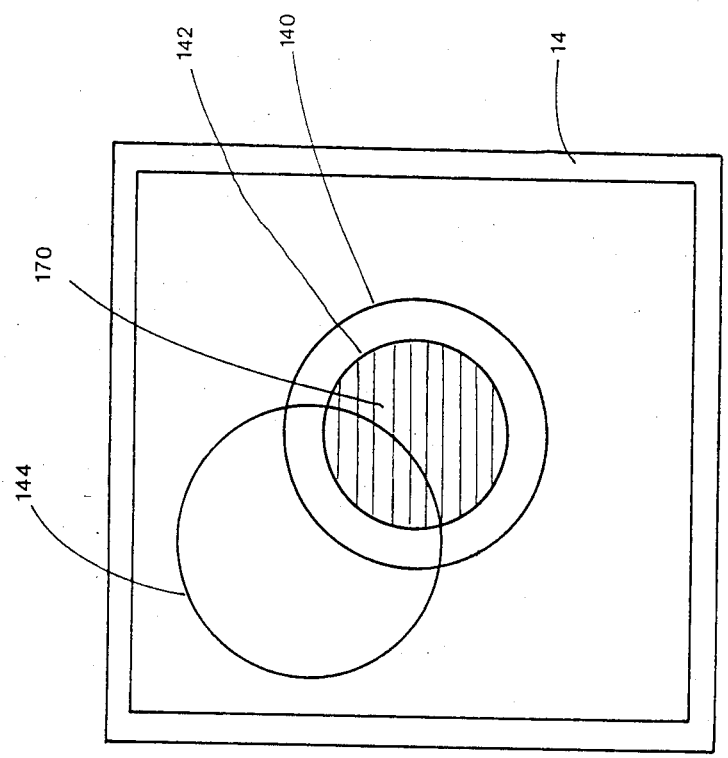
FIG. 7 is a representation of the image display on the monitor for various versions of endoscopes.

Another parameter unique to the particular type of endoscope is the size and location of the image formed on the image sensor. The size of the image 90 formed on the image sensor 72 (FIG. 2) is strictly a function of the diameter of the optical focusing section, which is limited by the diameter of the insertion tube 16 (FIG. 1). In addition, the image formed on the image sensor may be off-centered because in order to provide compact packaging in the viewing head. The function of these identifying parameters is illustrated FIG. 7, which depicts the various size and locations of images formed on the monitor for various types of endoscopes. The image designated by line 140 is the image formed by CCD 72 in a colonoscope, which forms an image 92% of the height of the A register. Similarly, the image designated by line 142 is the image for a gastroscope, which forms an image 70% of the height of the A register. The image designated by line 144 is the image generated by a duodenoscope, which also forms an image 70% of the height of the A register, but which is shifted into the upper left corner.

Figure 6:
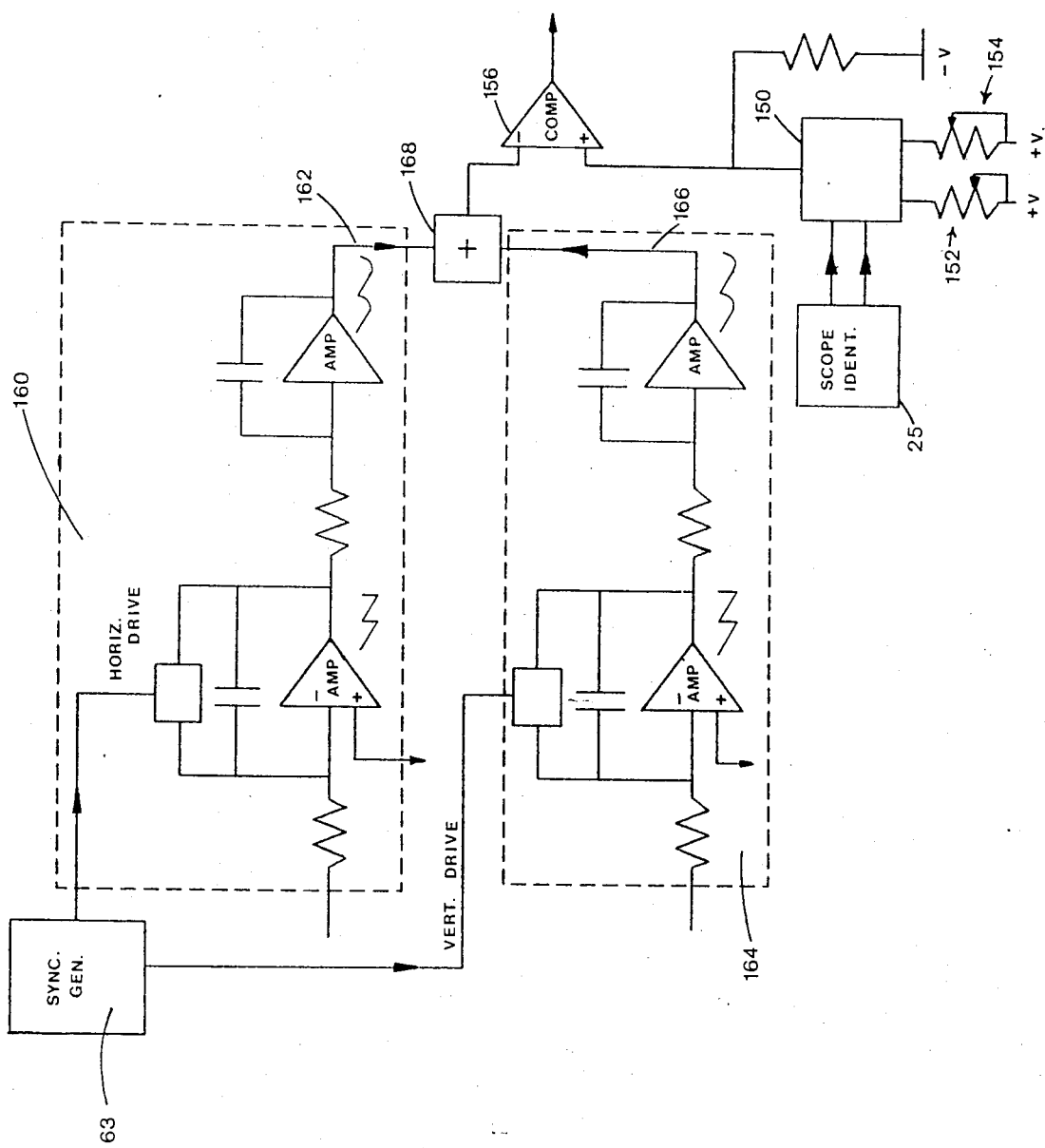
FIG. 6 is a diagram of a circuit in the control unit to provide circular blanking to the monitor in response to signals from the endoscope identifying the type of endoscope.

Illustrated in FIG. 6 is circuitry utilized in the control unit 12 to provide circular blanking to the monitor so that only the image designated as one of the circular patterns 140, 142, or 144 is present on the monitor, the remaining portions of the monitor being black. As shown in FIG. 6, an input signal, e.g. the present or absence of a voltage, corresponding to the parameter designating the particular endoscope is electrically connected to a switch 150. Switch 150, depending upon the position it is in, connects a comparator 156 to different reference voltages 152, 154. Thus, for example, if the operating section 20 happens to be a colonoscope, the signal provided by the scope identification section 25 will cause reference voltage 152 to be supplied to comparator 156. Likewise, if the operating section 20 happens to be a gastroscope, reference voltage 154 will be connected to the comparator 156. As shown in FIG. 6, the circuit designated as block 160 receives the horizontal drive pulse from the sync generator 63 and produces a parabolic waveform on output line 162. The circuit designated as block 164 receives the vertical drive pulse from the sync generator 63 and generates a parabolic waveform along line 166. The two signals from lines 162, 166 are summed at junction 168 and the output from junction 168 is input to comparator 156. Because there are 262.5 horizontal scans for every vertical scan provided by the sync generator 63, there will be 262.5 horizontal parabolic pulses superimposed on one vertical parabolic pulse. The result of the comparator output 156, dependent upon which reference voltage 152, 154 is supplied to it by switch 150, is a circular pattern on the monitor 14 indicated by the shaded portion 170. Inversion of the signal from comparator 156 will invert the image on monitor 14 so that the area outside of pattern 170 will be black. Thus the size of the black field on monitor 14 will depend on the position of switch 150, which is controlled by a signal from the scope identification section 25 of endoscope operating section 20.

As should be apparent from the preceding description, taken with reference to the accompanying drawings, the present color video endoscope system provides interchangeable endoscope sections which are fully compatible with the control unit, regardless of the endoscope version connected to the control unit. In particular, the operating section of the endoscope contains means for generating signals corresponding to specific parameters of the endoscope, such as signals for optimizing the clocking pulses to the image sensor, signals for setting up the flare, gain, and black levels to the video processor, and signals for identifying the size and location of the image on the image sensor. It is to be especially noted that while the invention has been described with particular emphasis on a color video endoscope system which utilizes a frame-transfer type of CCD, the novel features of the invention are fully applicable to systems which utilize other types of CCDs, such as an interline transfer CCD in which the storage register is integrated into the image register, or a frame readout CCD which has no storage register. In addition, the present invention provides a sequential color generating means which utilizes blanking fields between color fields to permit the clocking of data out of the image sensor during the blanking fields.

While the preferred embodiments of the present invention have been illustrated in detail, it should be apparent that modifications and adaptations of those embodiments will occur to those skilled in the art. However, it is to be expressly understood that such modifications and adaptations are within the sphere and scope of the present invention as set forth in the following claims.

What is claimed is:

1. A color video endoscope system for use in displaying an image from inside a cavity onto a monitor comprising:

an endoscope insertable into a cavity, the endoscope further comprising a light guide for directing light into the cavity, means for focusing the reflected light, an image sensor for receiving the focused light, means electrically coupled to the image sensor for buffering input signals clocked to the image sensor, and means electrically coupled to the image sensor for amplifying output signals from the image sensor; and a control unit connected to the endoscope, the control unit further comprising means for generating sequential fields of colored light and providing said light to the endoscope light guide, means for clocking a signal out of the image sensor, means for modifying the peak-to-peak amplitude and the reference level of the image sensor output signal corresponding to each of the color fields, means for temporarily storing data present in the modified signal for each color field, means for combining data, which data may include the temporarily stored data, for each color field into a composite video signal for receipt by the monitor, and means for synchronizing the image sensor clocking means, the image sensor output signal modifying means and the data storing means with the means for generating sequential fields of colored light.

2. The color video endoscope system according to claim 1 wherein the endoscope includes means for generating a signal identifying the value of a parameter of the endoscope and wherein the control unit includes means responsive to the parameter signal, whereby the control unit is capable of operation with various endoscopes.

3. The endoscope system according to claim 2 wherein the parameter signal generating means include means for generating a signal identifying the value of gain characteristics of the image sensor, and wherein the image sensor output signal modifying means of the control unit includes means for modifying the image sensor output signal in response to the signal identifying the value of gain characteristics.

4. The endoscope system according to claim 2 wherein the parameter signal generating means include means for generating a signal identifying the value of flare characteristics of the image sensor, and wherein the image sensor output signal modifying means of the control unit includes means for modifying the image sensor output signal in response to the signal identifying the value of flare characteristics.

5. The endoscope system according to claim 2 wherein the parameter signal generating means include means for generating a signal identifying the value of black level characteristics of the image sensor, and wherein the image sensor output signal modifying means of the control unit includes means for modifying the image sensor output signal in response to the signal identifying the value of black level characteristics.

6. The endoscope system according to claim 2 wherein the parameter signal generating means includes means for generating a plurality of preset optimum voltage levels, and wherein the means in the control unit for clocking the signal out of the image sensor includes means responsive to the preset optimum voltage levels.

7. The endoscope system according to claim 6, wherein the image sensor is a frame-transfer charge coupled device (CCD) having an A register, a B register, and a horizontal shift register, wherein the clocking means in the control unit includes means for generating a series of pulses to move the charges in the CCD from the A register to the B register, a series of pulses to move the charges in the CCD from the B register to the horizontal shift register, and a series of pulses to move the charges in the CCD out of the horizontal shift register, and wherein the preset optimum voltage levels generated from the endoscope correspond to the levels of the pulses clocked from the clocking means of the control unit to the CCD.

8. The endoscope system according to claim 2, wherein the parameter signal generating means includes means for generating a signal identifying the size of the image received on the image sensor, and wherein the control unit includes means for generating circular blanking of the output on the monitor in response to the signal identifying the size of the image present on the image sensor.

9. The endoscope system according to claim 8, wherein the means for generating circular blanking further comprises means for converting a horizontal drive signal from the synchronization means into a parabolic waveform, means for converting a vertical drive signal from the synchronization means into a parabolic waveform, means for summing the horizontal and vertical parabolic waveform outputs, and means for comparing the summed signal with a reference voltage, and wherein the means for generating a signal identifying the size of the image on the image sensor further comprises means for generating the reference voltage to the comparing means.

10. The endoscope system according to claim 1 wherein the image sensor is a frame-transfer charge coupled device (CCD) having at least two registers, one of the registers being aligned with the light focusing means for receipt of the focused light, wherein the color field generating means includes means for generating a blank field between successive color fields, and wherein the means for clocking the signal out of the CCD includes means for transferring the charges in the CCD from one register to the other register during a blank field.

11. The endoscope system according to claim 10 wherein the color field generating means further comprises a color wheel having circular filter segments of red, green, and blue, and opaque circular segments between the color filter segments.

12. The endoscope system according to claim 11 wherein the color wheel includes a pattern of opaque and transparent filters on its perimeter and means coupled to the synchronization means and responsive to the pattern of light generated by the passage of the pattern on the color wheel past the light source for synchronizing the speed of the color wheel.

13. The endoscope system according to claim 1 wherein the data combining means includes means for transferring data corresponding a color field to both a temporary storage means and to the composite video output signal simultaneously, whereby the composite video signal includes both stored color field data and unstored color field data.

* * * * *